(No Model.)
L. A. LE MIEUX.
STEAM ENGINE.
No. 441,177. Patented Nov. 25, 1890.
Fig. 1.
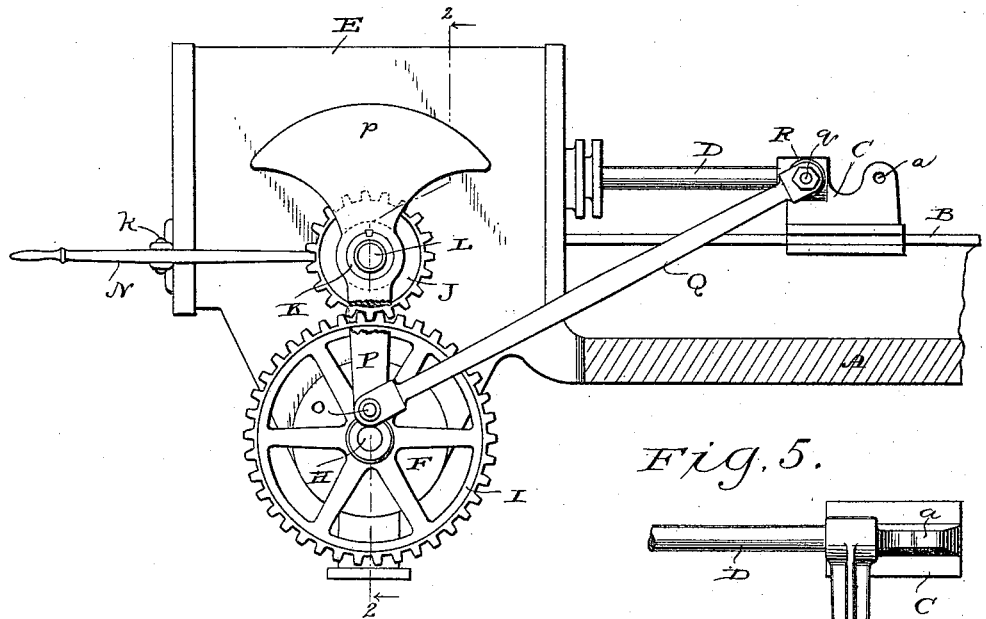
Fig. 5.
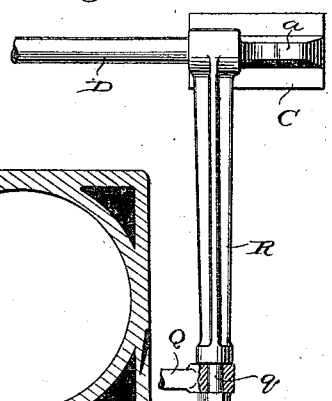
Fig. 3. Fig. 4.
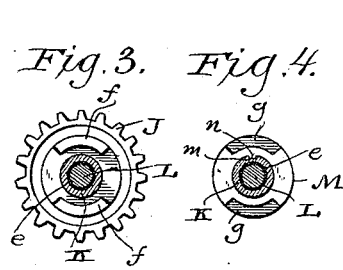
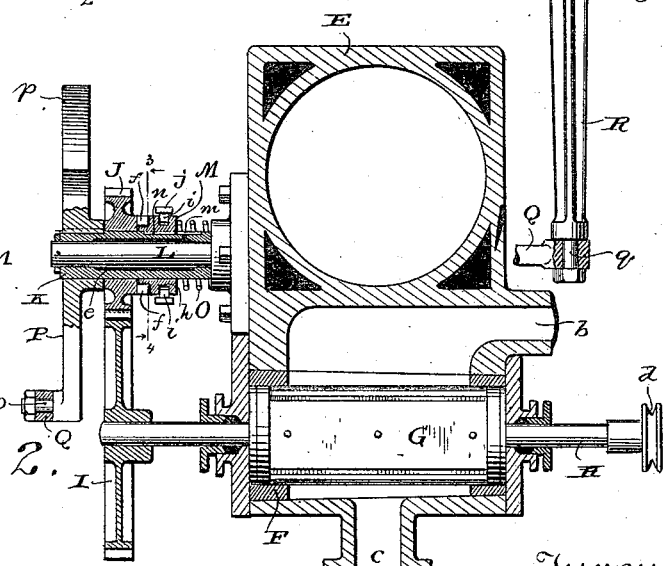
Fig. 2.
Witnesses
Geo. W. Young.
William Klug
Inventor
Lucius A. Le Mieux
By Stout & Underwood
Attorneys

UNITED STATES PATENT OFFICE.

LUCIUS A. LE MIEUX, OF SEYMOUR, WISCONSIN.

STEAM-ENGINE.

SPECIFICATION forming part of Letters Patent No. 441,177, dated November 25, 1890.

Application filed August 19, 1889. Serial No. 321,244. (No model.)

*To all whom it may concern:*

Be it known that I, LUCIUS A. LE MIEUX, of Seymour, in the county of Outagamie, and in the State of Wisconsin, have invented certain new and useful Improvements in Steam-Engines; and I do hereby declare that the following is a full, clear, and exact description thereof.

My invention relates to steam-engines; and it consists in certain peculiarities of construction, as will be fully set forth hereinafter and subsequently claimed.

In the drawings, Figure 1 is a side elevation of a portion of a steam-engine with parts broken away, embodying my present invention, shown in connection with a rotary valve. Fig. 2 is a vertical transverse section of the same on the line 2 2 of Fig. 1. Figs. 3 and 4 are details illustrating a form of clutch used with the same. Fig. 5 is a detail illustrating the connection between the piston-rod, cross-head, and connecting-rod shown in Fig. 1.

A represents the bed-plate of an engine, and B the guides or ways for the cross-heads C, which latter is connected at $a$ in the ordinary manner by a connecting-rod to a crank or driving wheel on the main driving-shaft. (Not shown.) D is a piston-rod connected to said cross-head and operating within the steam-cylinder E, beneath which is shown a valve-chest F, containing a rotary valve G, the especial construction of which forms no part of this present invention.

In Fig. 2 I show the inlet-port $b$ and exhaust-port $c$, the latter opening downward from the bottom of the valve-chest for the purpose of drainage; but the live-steam ports connecting the ends of the cylinder with the valve-chest are not shown.

H is the valve rod or shaft, which bears upon one end a pulley or gear $d$ for connection with a governor (not shown) and upon its other end a gear-wheel I, meshing with a pinion J, loose upon a sleeve K, which in turn is loose upon a stud or arbor L, secured to and projecting horizontally from the outside of the steam-cylinder E, the said sleeve having an increased bore between its ends, as shown at $e$, for the purpose of decreasing frictional resistance and forming a lubricating-chamber. The hub of the pinion J is provided on one face with the segmental projections $ff$ opposite each other and with spaces of equal distance between their adjacent ends.

M is a clutch having on its face adjacent to the hub of pinion J opposing segmental depressions $g\ g$, corresponding to the described projections $ff$ on said hub, and having segmental projections between said depressions $g\ g$, corresponding to the spaces between the projections $ff$ on the face of said hub. The said clutch M is further provided with a circumferential groove $h$ for the teeth $i\ i$ of a spanner $j$, whose handle N forms a shifting-lever for said clutch, being pivoted, as shown at $k$, to the end of the cylinder or other convenient part of the engine, and between the other face of this clutch and the cylinder there is a spring O, coiled around the sleeve K, which latter is provided with a longitudinal external groove $m$ for the reception and guidance of a feather $n$, formed on the clutch M and projecting into its bore.

Fast on the outer end of the sleeve K is the hub of a weighted crank-arm P, whose weighted end $p$ is preferably in the segmental form shown in Fig. 1, the better to serve as a balance-wheel to carry the crank beyond a dead-center, and to the extreme end of the crank-arm there is wristed, as shown at $o$, one end of a connecting-rod Q, whose other end is wristed, as shown at $q$, to the outer end of an arm R, which is rigidly secured to and projects from the cross-head C.

The operation of my device will be readily understood from the foregoing description of its construction. When the clutch is adjusted, as shown in Fig. 2, so that the projections $ff$ on the hub of the pinion J are in engagement with the depressions $g\ g$ of the said clutch, then when the steam is admitted to the cylinder and the piston-rod commences to move the cross-head and its arm R actuates the connecting-rod Q, and the latter by the crank-arm P revolves the sleeve K and the pinion J, (now secured by the clutch thereto,) and this revolves the wheel I in mesh with said pinion, and thus rotates the valve G, to whose shaft the wheel I is secured, as stated. To reverse the valve it is only necessary to free the clutch M from the hub of the pinion J until the sleeve K and clutch have made a half-revolution, when the handle-lever N is released, and the spring O will instantly force the clutch and hub again into engagement, and the valve will be rotated, as before, but in a reversed position with relation to the steam-ports of the valve-chest, the pinion J being just half the size of the wheel I.

Having thus fully described my invention, what I claim as new, and desire to secure by Letters Patent, is—

1. In a steam-engine, the combination, with the steam-cylinder, valve, and valve rod or shaft, piston, and piston-rod, and cross-head connected to said piston-rod, of a rigid arm projecting from said cross-head, a connecting rod or lever connected to and actuated by said rigid arm, a stud on the cylinder, a revoluble body mounted loosely on the cylinder-stud and wristed to the said connecting rod or lever, and a gear-connection between said revoluble body and the valve rod or shaft, substantially as set forth.

2. In a steam-engine, the combination, with the steam-cylinder, valve, and valve-shaft, piston, and piston-rod, and cross-head connected to said piston-rod, of a rigid arm projecting from said cross-head, a stud projecting from the cylinder, a sleeve mounted loosely on said stud, a weighted crank-arm fast on said sleeve, a connecting-rod wristed to said crank-arm and to said rigid arm, a pinion loose upon said sleeve, a gear-wheel fast on the end of the valve-shaft and in mesh with said loose pinion, and a clutch on said sleeve adapted for engagement with the hub of said loose pinion, substantially as set forth.

In testimony that I claim the foregoing I have hereunto set my hand, at Milwaukee, in the county of Milwaukee and State of Wisconsin, in the presence of two witnesses.

LUCIUS A. LE MIEUX.

Witnesses:
H. G. UNDERWOOD,
WILLIAM KLUG.